United States Patent [19]

Scarton et al.

[11] Patent Number: 4,516,658
[45] Date of Patent: May 14, 1985

[54] COULOME FRICTION NOISE AND VIBRATION DAMPING

[75] Inventors: Henry A. Scarton, Troy; John A. DiBianca, Webster, both of N.Y.; James A. Lacey, Pittsburgh, Pa.; Warren C. Kennedy, Schenectady, N.Y.

[73] Assignee: Rensselaer Polytechnic Institute, Troy, N.Y.

[21] Appl. No.: 470,515

[22] Filed: Feb. 28, 1983

[51] Int. Cl.³ .............................................. F16F 15/00
[52] U.S. Cl. ................................. 181/208; 173/139; 408/143; 409/141; 82/DIG. 9; 181/296
[58] Field of Search ............... 181/207, 208, 209, 243, 181/282, 290, 294, 296; 173/139; 408/143; 409/141; 82/DIG. 9

[56] References Cited

U.S. PATENT DOCUMENTS

| | | | |
|---|---|---|---|
| 780,332 | 1/1905 | Forshee | 181/207 |
| 1,975,918 | 10/1934 | Berg | 181/208 |
| 2,541,156 | 2/1951 | Geiger | 181/208 |
| 2,764,136 | 9/1956 | Gadd | 181/207 |
| 4,023,651 | 5/1977 | Healiss | 181/207 |

*Primary Examiner*—L. T. Hix
*Assistant Examiner*—Brian W. Brown
*Attorney, Agent, or Firm*—McGlew and Tuttle

[57] ABSTRACT

A technique for reducing noise generated by transverse vibrations in elongated members comprises the application of a friction element on a surface of the member. The friction element is forced against one or more surfaces of the member by a selected normal force and is provided in a vicinity of maximum distortion of the member when the member undergoes vibrations. A differential movement between the inner surface of the friction element and the outer surface of the member causes heat to be generated which dissipates the energy of such transverse vibrations.

24 Claims, 20 Drawing Figures

COULOME FRICTION NOISE AND VIBRATION DAMPING

FIELD AND BACKGROUND OF THE INVENTION

The presnt invention relates in general to noise abatement techinques and in particular to a new and useful method and apparatus for reducing noise generated by transverse vibrations in an elongated member, which vibrations are transverse to a major axis or dimension of the elongated member.

Various approaches to noise abatement are known particularly for elongated percussion tools. U.S. Pat. No. 4,030,553 to Rockwell for example discloses noise dampening within percussion tools by providing structural discontinuities selectively placed within the tools relative to nodes or anti-nodes of vibration for the tools. These structural discontinuities typically take the form of threaded joints.

U.S. Pat. No. 2,680,333 to Calosi relates to a vibration control device including threaded engagements between an outer sleeve and inner tool.

Approaches are also known for dampening the vibration of flat panels or sheets. U.S. Pat. No. 4,023,651 to Healiss discloses the use of flexible pads secured to metal sheets by magnetic attraction for this purpose.

Other U.S. Patents which are relevant to the present invention are U.S. Pat. No. 1,609,136 to Stevens which discloses the use of an elastic collar; U.S. Pat. No. 3,168,324 to Kennell which discloses a structure for limiting the vibration of a tool bit; U.S. Pat. Nos. 3,179,185 to O'Farell which shows a damper for dampening lateral vibrations; 2,685,274 to Liddicoat which utilizes an elastic collar; 4,195,713 to Hatjer et al which shows a sandwich structure for dampening vibration; 3,662,855 to Adams et al; and 3,848,931 to Swisher.

SUMMARY OF THE INVENTION

The present invention is drawn to a method and apparatus of dampening vibrations in elongated members such as panels, shafts, columns, percussion tools and other machine members, which utilizes a phenomenon kniown as Coulomb friction damping.

An elongated member may experience vibrational motions of two fundamental types; (a) a rigid-body (translation or rotation); and (b) distortional (changes in shape or volume). This invention is directed toward the damping of distortional vibrational motion. The underlying principle of this invention is the fact that any form of distortional vibration of the member (most commonly flexural vibration, but also longitudinal or torsional vibration) will result in slight, time-varying distortions of the various surfaces of the member. If an element is made so that one of its surfaces matches a surface of the member when the member is not vibrating, and if the member is so arranged that its aforementioned surface and the matching surface of the element are held fast so as to be frictionally engaged, then when the member undergoes vibration the resulting distortions of the matching surface of the element will not be exactly the same as the distortion experienced by the engaged surface of the member. As a consequence of the difference between the distortions a localized relative tangential interfacial motion, hereinafter referred to as "frictional sliding", will develop between points on the matching surface of the element and the engaged surface of the member. The relative tangential interfacial motion occurs in the presence of and is opposed by frictional resistance, and as a reslt, heat is generated, thereby dissipating the energy of vibration and thus damping the vibration and noise of the member.

In its broadest sense, the invention comprises the application of a frictional element against a flexing surface of a member whose vibrations are to be dampened and the application of a normal force between the friction element and the member whose magnitude is chosen so as to maximize the Coulomb friction effect.

Accordingly, a further object of the invention is to provide a method of reducing noise generated by transverse vibration in an elongated member, when said vibrations are transverse to a major axis or dimension of the elongated member, comprising: providing a friction element having a friction slide surface and made of material which is sufficiently inextensible so that with said friction slide surface engaged to a flexing surface of said member under a selected normal force, said friction sliding surface will slide with respect to said member surface; disposing the element friction slide surface over an area of the member surface which is sufficiently large to cover substantially an area of maximum transverse vibration of the member; and applying a selected normal force between the element and the member to increase the frictional force therebetween so that the area of maximum transverse vibration shrinks and expands to cause slidage with said element friction slide surface and generate heat to dissipate energy of the noise.

Another object of the invention is to provide apparatus for achieving the method.

Such apparatus may take the form of a flat planar element that is applied against a flat planar surface of a planar elongated member. The flat planar element may be magnetic to inherently generate the normal force where the elongated member is magnetically attractable, or may be utilized in conjunction with a counter-panel of magnetically soft (a ferromagnetic material which can be magnetized in the presence of an external field, but which does not retain its magnetization when the magnetic field is removed) material which is positioned on an opposite side of the member from the magnetic element.

Where the elongated member is in the form of a percussion or rotary tool, an object of the invention is to provide an apparatus for reducing noise generated by transverse vibrations of the tool which comprises a sleeve held firmly on an outer surface of the tool and means for securing the sleeve at a fixed axial position on the tool.

A further object of the invention is to provide such an apparatus wherein the means for holding the sleeve comprises self-locking helical threads defined on an inner surface of the sleeve and an outer surface of the tool, the Coulomb friction damping surface being defined on an inclined portion of the tool and a mating incline portion of the sleeve.

A still further object of the invention is to provide an apparatus for reducing noise generated by transverse vibrations in an elongated member which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
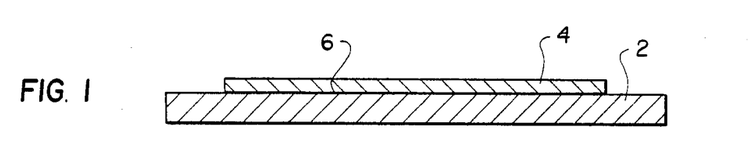
FIG. 1 is a side sectional view of a fundamental form of the invention which is utilized to dampen transverse vibrations of a planar member using a planar element.
Figure 11:
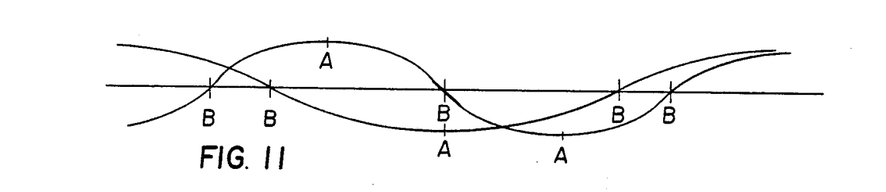
FIG. 11 is a graph showing vibration modes along the length of an elongated tool.

Referring to the drawings in particular, the invention embodied therein in FIG. 1, comprises a technique, including a method and apparatus of dampening transverse vibrations in an elongated number 2. In the case of FIG. 1, the elongated member 2 is a flat planar member such as a piece of sheet metal or other material. When struck, either intentionally or accidentally, for example during transport, such elongated members generate noise in the form of transverse vibrations. As shown in FIG. 11 these transverse vibrations may be generated in various vibration modes.

Figure 2:
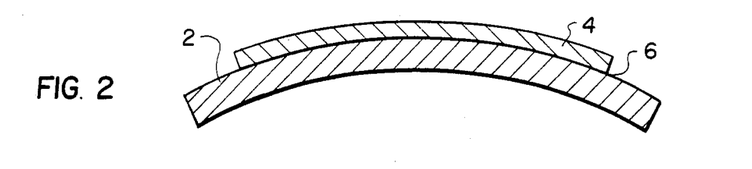
FIG. 2 is a view similar to FIG. 1 showing the member in a flexed position due to vibration.

In FIG. 2, the simplest form of vibration is shown wherein the member 2 is simply bent substantially at its center. It is understood that FIG. 2 shows only one direction of bending that in an actual vibration of member 2, the bending will alternate from the position shown in FIG. 2 with the panel bent upwardly, to an alternate position with the panel bent downwardly.

According to the invention, a noise abatement structure in the form of a Coulomb friction element 4 is applied to a surface of the member 2 to form an interface area 6. The material of element 4 should be sufficiently strong to resist elongation or compression thereof with bending of member 2 so that upon bending of member 2 as shown in FIG. 2, a sliding or displacement in the interface area 6, takes place. This sliding generates heat which, due to the conservation of energy, dissipates the energy of vibration.

To maximize this frictional engagement, element 4 should be held against panel 2 with a selected amount of normal force to the interface area 6. In the embodiment of FIG. 1, element 4 is made of magnetic material and it is assumed that member 2 is magnetically attractable. Thus, in the simplest possible manner, the required normal force is obtained.

Figure 3:
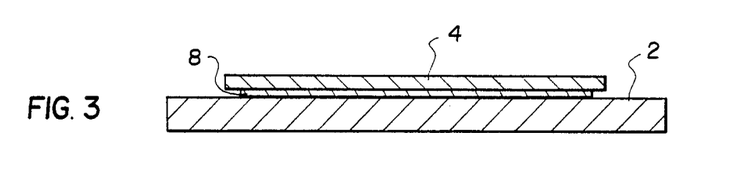
FIG. 3 is a view similar to FIG. 1 of another embodiment of the invention wherein an additional inextensible member is utilized as the element held against the member by a magnetic panel.

In the embodiment of FIG. 3, an additional inextensible or substantially inextensible panel 8 acts as the friction element and is held against the member 2 by a magnetic panel 4. In FIG. 3 as with all the other figures of this application, the same numerals are utilized to designate the same of similar parts.

Magnetic panel 4 may for example be made of ferromagnetic material with inextensible element or strip 8 being made of spring steel.

Figure 4:
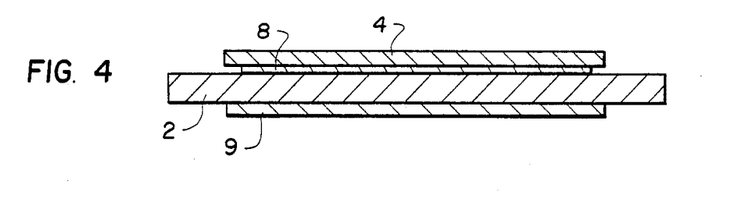
FIG. 4 is a view similar to FIG. 3 of a still further embodiment of the invention wherein the member is non-magnetic.

In the embodiment of FIG. 4, it is assumed that the member 2 is non-magnetic. In this case, in order to establish the required normal force between an interface surface of strip 8 and member 2, a counter panel of magnetically "soft" material 9 is applied to an opposite surface of member 2 so that it is attracted by magnetic panel 4 and thus holds strip 8 firmly against member 2.

Figure 5:
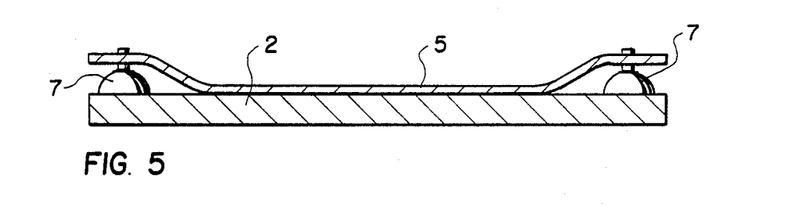
FIG. 5 is a view similar to FIG. 3 of another embodiment of the invention wherein suction cups are utilized to hold the element to the elongated panel member.

In the embodiment according to FIG. 5, suction cups 7 are connected in opposite ends of a friction element 5 which has a maximum possible surface in firm contact with an outer surface of member 2.

In the foregoing embodiments, the friction element should be applied as far as possible to and over an area of maximum flexing for the elongated member 2. These areas can be established by known fundamental vibration modes for the panel or member 2, two of which are illustrated in FIG. 11.

It is noted that the transverse vibration modes illustrated by FIG. 11 are equally applicable to rod-like elongated members such as the generally axially symmetrical percussion and rotary tools described hereinafter.

Figure 6:
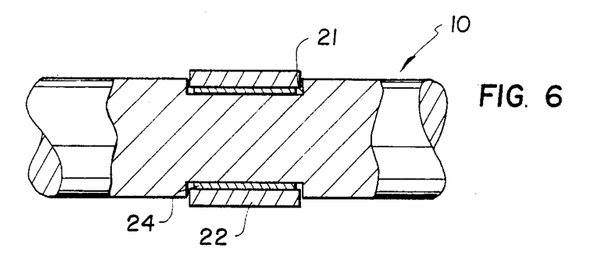
FIG. 6 is a side sectional view partially in elevation of an elongated percussion tool having a noise abatement device applied thereto according to the invention.

In FIG. 6, an elongated percussion or rotary tool generally designated 10 is shown having a recessed area 21. Such a tool can for example by a rock drill, a peen, a chisel, pile driver or the like. Over recessed area 21 a ring 22 is provided which is advantageously made of spring steel. Ring 22 may be lined with a wear layer 24 of suitable wear-resistant material. The layer 24 may also comprise a ring separate from ring 22. The material is chosen to increase the frictional contact between an inner surface of layer 24 and the outer surface of tool 10 in the area of recess 21. Recess 21 is provided to restrain the ring 22 from axial motion.

It is very important that the ring 22 specifically, and in general, the friction element, be prevented from axial or rotational motion with respect to the elongated member. No such motion is desired since the Coulomb friction damping effect is achieved as a consequence of the localized relative tangential motion ("frictional sliding") that develops between points on the matching surfaces of the friction element and the elongated member as a result of the transverse bending of the elongated element as shown in FIG. 2 rather than any rigid body translational relative motion between the friction element and elongated member. As will be discussed hereinunder such rigid body relative translational or rotational motion is also undesirable since it increases the rate at which engaged surfaces of friction element and elongated member wear.

As with the foregoing embodiments, noise dampening is achieved by a differential movement between the outer ring and the inner tool, as the inner tool flexes or bends due to vibrations.

Figures 7, 8, 9:
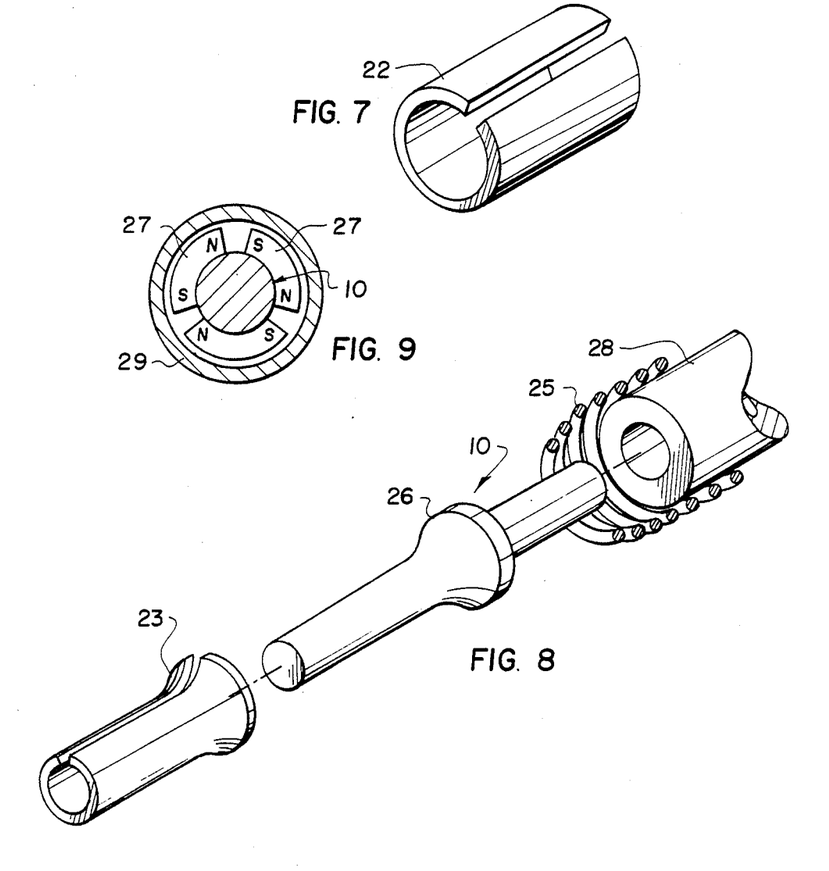
FIG. 7 is a perspective view of a noise abatement ring used in the embodiment of FIG. 6.
FIG. 8 is an exploded perspective view of another embodiment of the invention utilized to dampen transverse vibrations of an elongated percussion tool or member.
FIG. 9 is a cross-sectional view of a further embodiment of the invention for dampening vibrations of a percussion tool.

FIG. 7 shows an embodiment of ring 22 as a simple split spring steel ring. Other clamps or retainers may be provided however, for establishing the necessary normal force between an inner surface of ring 22 or layer 24, and the other surface of tool 10.

FIG. 8 shows a more elaborate structure wherein percussion tool 10 includes a flange 26 and is adapted to be received within an opening of a percussion hammering device shown only in part at 28.

A split ring 23 which includes a flange area for overlying a surface of flange 26 is provided over tool 10 and may be restrained against excessive axial movement by a spring retainer 25.

As shown in FIG. 9, a ring can be made up of ring segments 27 which each are magnetic and have poles at circumferential ends as shown. Ring segments 27 thus form a substantially continuous ring around a surface of tool 10 and are held there by magnetic force. A casing or cover 29 may be provided to prevent dislodging of the segments 27 in case of exceptionally violent movement.

While the provision of a simple split or segmented ring on a tool is effected to dampen vibrations thereof, particularly when the rings are provided at an anti-node area of vibration for the elongated tool or member, after prolonged use, a wearing occurs between the surface due to the repeated relative displacement. This wearing phenomenon known as fretting eventually reduces the normal force originally established. The noise dampening effect thus deteriorates with time.

Significant fretting arises whenever there is a rigid-body relative movement (rotation or axial motion) between the collar or ring and the tool or elongated member. This relative motion, in particular on a percussion tool, is caused by impacts of the tool on the peen or chisel. Such relative motion is also the primary cause of any heat buildup that may be encountered, since in the absence of axial constraints, the rigid body derived surface motion will exceed that resulting from flexure (due to lateral bending of the tool) by several orders of magnitude. An important feature of the invention as shown for example in FIG. 6 and as will be described hereinunder with reference to additional embodiments, is that means are provided for minimizing the rigid body derived relative surface motion (translation or rotation) between the friction element and the elongated member.

The type of sliding contemplated according to the invention which produces the Coulomb friction damping effect, may be termed a "differential sliding" and is meant to be distinguished from sliding effected by rigid-body (gross) movement between the friction element and the elongated member. According to the invention, the "sliding" is caused by the bending of the elongated member and its engaged friction element. This bending causes an elongation or enlargement in one dimension of the elongated member surface when the elongated member is bending convexly toward the friction element. Conversely, a bending of the elongated member concavely away from the friction element causes a reduction or shortening of the member surface. This dimensional change causes differential slippage between the member surface and the contacting inner surface of the friction element which produces the Coulomb friction damping effect.

Figure 10:
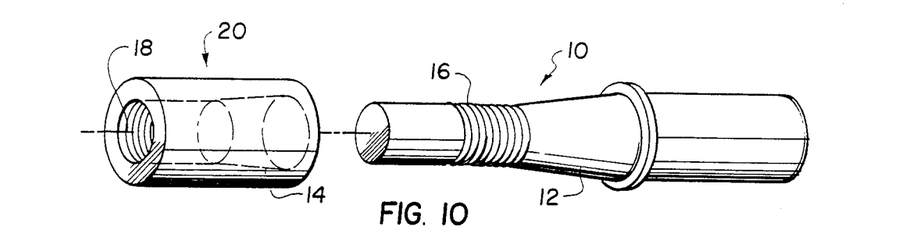
FIG. 10 is an exploded perspective view similar to FIG. 8 of a still further embodiment of the invention.

An embodiment of the invention which overcomes this problem as shown in FIG. 10.

FIG. 10 shows an elongated member known as a peen which is meant to be struck at one end. According to the invention, this member includes a tapered or inclined surface 12 which corresponds to a mating tapered surface 14 defined in a sleeve or collar 20. The peen 10 has an externally threaded area 16 which is threadably engaged by an internally threaded area 18 of sleeve 20. By threading sleeve 20 on peen 10 as shown in FIG. 2, a close frictional engagement is established between the tapered surfaces 12 and 14. When an elongated member is struck at one of its ends, it vibrates transversely to its major axis in a manner shown, for example, in FIG. 11.

The point of maximum bending is termed an antinode and is shown at A and the points which do not move from the axis are known as nodes and are shown at B according to one feature of the invention, the threaded area 16 is provided in the vicinity of one node B and the inclined surface 12 in the vicinity of the antinode A.

Figure 13:
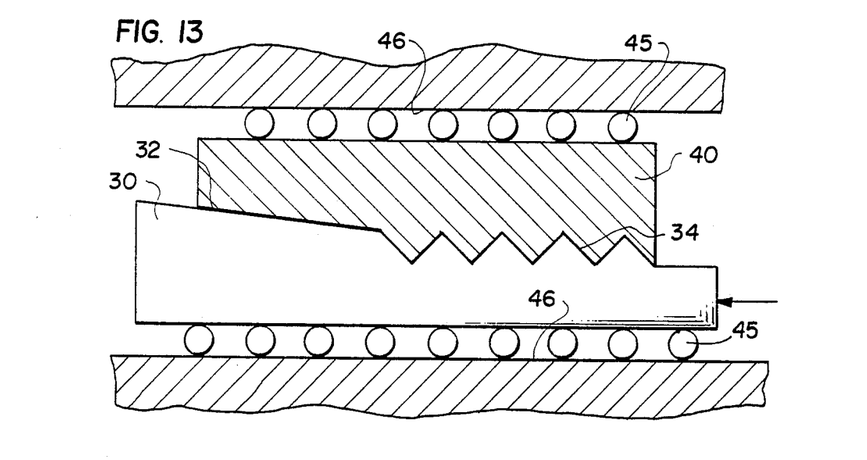
FIG. 13 is a schematic sectional view of another embodiment of the invention for reducing transverse vibrations of a generalized elongated member.

For non-circular elongated members shown at 30 in FIG. 13, a damper 40 is provided. The elements 30 and 40 have mating tapered surfaces 32 and engaged teeth 34 which correspond functionally to the tapered surfaces 12,14 and threads 16,18 of FIG. 10.

In FIG. 13, the elongated member 30 and damper 40 are held together for example by roller bearings 45 and between fixed surfaces 46.

Threads 16,18 and inclined surface 12, 19 can be self-locking and sleeve 20 is advantageously made of steel or other durable material.

An unexpected advantage of the structure shown in FIG. 10 is that even with repeated impacts on the peen, rather than loosening, the engagement between sleeve 20 and peen 10 actually tightens. This is due to the fact that in addition to vibrating in a manner shown in FIG. 11, the body of the peen 10 actually bulges out in a bulge area which propagates along the length of the peen. This bulging has been found to advantageously cause a tightening or at least retention of sleeve 20 on peen 10.

The threads of FIG. 10 and the teeth of FIG. 13 are here collectively termed ridges, since as noted above, they serve the same function.

Even if the mating tapered surfaces of FIGS. 10 and 13 undergo fretting, therefore, it has been found that the engagement between these surfaces is maintained at desired levels. The ring 20 or damper 40 thus can be thought of as consumable elements which have a far extended functional life.

Figure 12:
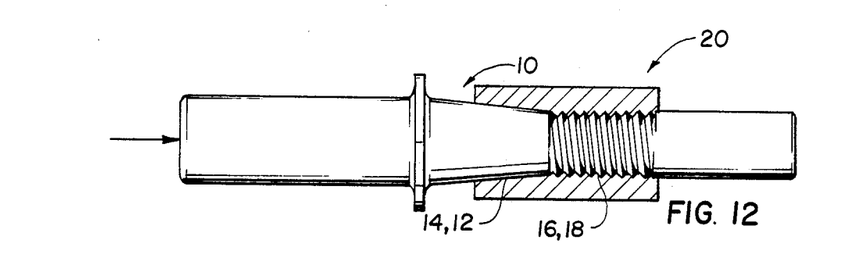
FIG. 12 is a side sectional view of the invention shown in FIG. 10.

According to a method of the invention which is illustrated in FIGS. 10 through 13, noise generated by transverse vibrations of the elongated member 10 in FIG. 10 or 30 in FIG. 13, which vibrations are transverse to the major dimension of the elongated member, is to be reduced by providing a friction element 20 or 40 having a friction slide surface and made of material which is sufficiently inextensible so that the friction slide surface when engaged with a surface of the elongated member under selected normal force frictionally slides with respect to the member surface. The method includes disposing the friction element slide surface which is at 14 in FIG. 10 and at 32 in FIG. 13, over an area of the member surface 20 or 30 which undergoes maximum transverse displacement under transverse vibration thereof. A selected normal force is applied between the element and the member to increase frictional engagement between the friction slide surface (14 in FIG. 10 or 32 in FIG. 13) and the member surface (12 in FIG. 10 and again at 32 in FIG. 13) so that localized lengthening or shortening of the member surface due to transverse vibration causes slippage between the friction slide surface and the member surface which generates heat and dissipates energy of the transverse vibrations. Another feature of the invention is that ridges are provided on the elongated member. These ridges can be threads 16 in FIG. 10 or ridges shown at 34 in FIG. 13. Ridges are also provided on the friction element (18 in FIG. 10 and also 34 in FIG. 13) and the ridges of the member and element are engaged together. The slide surface and engaged member surface are also inclined with respect to the ridges as shown in FIGS. 12 and 13. As shown in FIG. 10 and 12, these ridges may be in the form of external threads on the elongated member 10 engaged with internal threads 18 on the friction element 20. The friction element comprises a sleeve with the inclined slide surface 14 being inclined outwardly away from the threads and the member surface 12 being inclined outwardly away from the threads.

Figure 14:
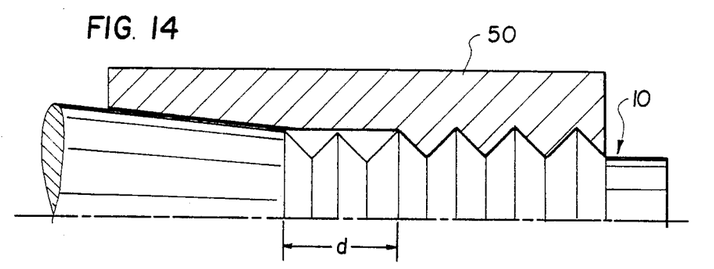
FIG. 14 is a partial sectional view of another embodiment of the invention.

FIG. 14 shows an embodiment of the invention in which the threads on ring or collar 50 are eliminated to a length d. This permits progressive wear and self-adjustment of the collar 50 on peen 10. Other parts of the embodiment of FIG. 14 correspond to those of the embodiment of FIG. 12.

Figure 15:
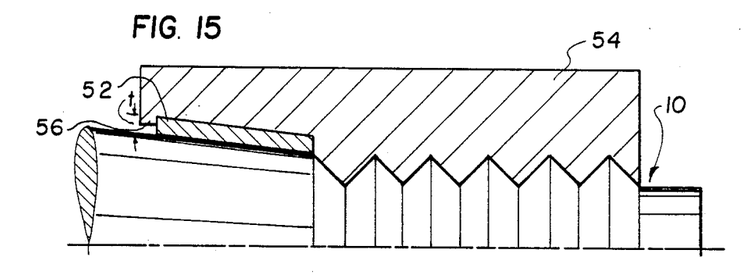
FIG. 15 is a view similar to FIG. 14 of a still further embodiment of the invention.

FIG. 15 shows the use of wear strip 52 having a thickness t which will decrease as wear processes during the useful life of collar 54 on peen 10. A lip 56 is provided for retaining wear strip 52 on collar 54. The wear strip or bushing may be made of the same material as the collar and peen (such as hardened S-7 tool steel). In this way an additional wear surface is created which may allow for added damping and a decrease in wear rate. The wear bushing can also be formed of multiple layers.

Figure 16:
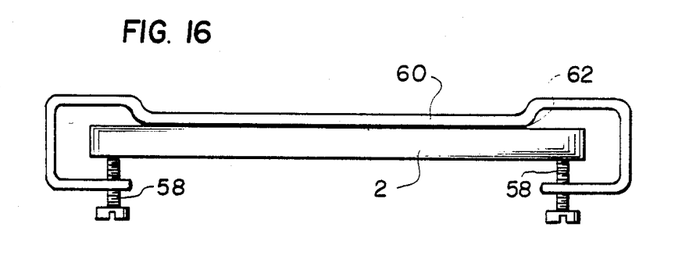
FIG. 16 is a view similar to FIG. 5 of an embodiment similar to that shown in FIG. 5 using clamps to hold the element against the elongated panel member.

FIG. 16 shows an embodiment similar to that of FIG. 5 wherein, rather than suction cups, clamping screws 58 are provided which are threaded into bent ends of plate member 60. In this way plate member 60 is engaged on a panel 2 to establish a Coulomb friction damping surface 62 therebetween.

As shown in FIGS. 17 through 20, multiple layers of friction damping elements may be provided to increase the Coulomb friction damping effect.

Figures 17, 18, 20:
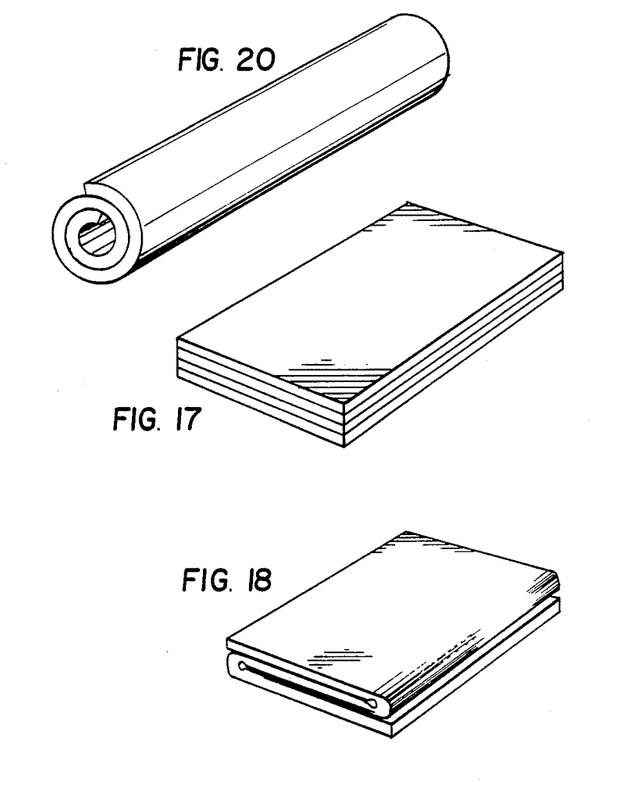
FIGS. 17 through 20 are perspective views of still further embodiments of the invention utilizing multi-layer structures for achieving the Coulomb friction damping effect.

In the embodiment of FIG. 17, multiple planar elements are provided which themselves can form a constructional element that is resistant to the generation of noise. The embodiment of FIG. 18 is similar to that of FIG. 17 except that a single longitudinally bent sheet is provided to form the multi-layered structure.

The embodiment of FIG. 20 shows concentric rings connected together to form a constructional unit which in itself can form a percussion tool. FIG. 20 shows a similar structure wherein the multiple layers are formed by a spirally wound sheet.

Figure 19:
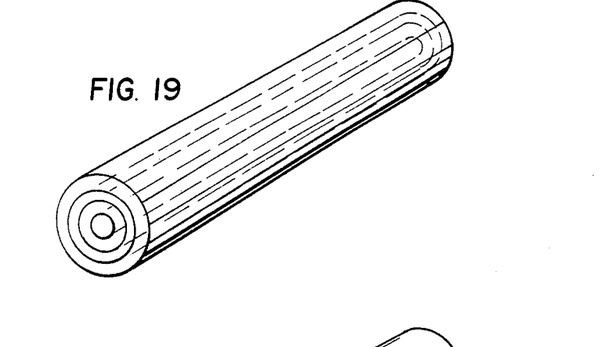

In the embodiments of FIGS. 17 through 19, the multiple layers may be connected to each other by welding at the edges or at other convenient locations to permit the Coulomb friction damping effect to take place (that is the differential sliding between engaged layers). Where possible, mere press fitting is sufficient (for example in the embodiment of FIG. 19).

While specific embodiment of the invention have been shown and described in detail to illustrate the application of the principles of the invention, it will be understood that the invention may be embodied otherwise without departing from such principles.

What is claimed is:

1. A device for reducing noise generated by transverse vibrations in an elongated rod-like member having an annular member surface which undergoes bending due to such transverse vibrations, comprising:
   a friction ring having an inner friction surface engaged with the annular member surface; and
   retaining means associated with said friction ring for establishing a selected normal force between said friction surface and the member surface to increase a frictional engagement therebetween so that bending of the member surface due to transverse vibrations produces frictional sliding between said friction surface and the member surface.

2. A device according to claim 1, wherein said retaining means comprises a recess defined on the elongated member, said ring disposed in said recess and held in said recess against axial relative motion between said ring and the elongated member.

3. A device according to claim 1, wherein the elongated rod-like member includes a flange, said ring including a flange engaged over at least a portion of the elongated member flange.

4. A device according to claim 1, wherein said ring comprises a steel split ring, said retaining means including a resiliency of said steel split ring for holding an inner surface of said steel split ring against the outer annular member surface of the elongated member.

5. A device according to claim 4, including a frictional layer disposed between said steel split ring and the elongated member for increasing frictional engagement between said friction surface and the member surface.

6. A device according to claim 5, wherein said retaining means comprises a recess in the elongated member for receiving said ring and on which the member surface is defined.

7. A device according to claim 1, wherein said ring comprises a plurality of ring segments, said retaining means comprising each ring segment being magnetic and having poles arranged to attract an adjacent ring segment.

8. A device according to claim 1, wherein said retaining means comprises internal threads formed on said ring and external threads formed on the elongated member adjacent the annular member surface thereof, said ring threads threadably engaged with the elongated member threads and said friction surface defined adjacent said ring threads.

9. A device according to claim 8, wherein said ring and member threads are self-locking.

10. A device according to claim 9, wherein said friction and member surfaces are inclined outwardly in a direction away from said threads whereby when the elongated member is impacted at an end thereof to generate the transverse vibrations, said threads are operable to increase a force of engagement between said ring and member inclined surfaces.

11. A device according to claim 8, wherein the member surface is inclined and said friction surface is inclined in a direction to mate with the member surface.

12. A device according to claim 11, wherein the member surface is inclined outwardly away from the member threads and said friction surface is inclined outwardly away from said ring threads.

13. A device according to claim 12, wherein the elongated member when transversely vibrating has node areas and anti-node areas, said ring and member threads being provided substantially in one of said node areas and said inclined surfaces established substantially in one of said anti-node areas.

14. A device according to claim 12, including a wear strip engaged with said ring and defining said friction surface.

15. A device according to claim 12, wherein said ring includes an unthreaded area between said inclined surface and said threads so that, with wearing of said friction surface and mated annular member surface, said ring is permitted to become threaded more tightly on said elongated member.

16. A device for reducing noise generated by transverse vibrations in an elongated member having a member surface which undergoes bending due to such transverse vibrations, comprising:

a friction element having a friction surface engaged with the member surface; and retaining means associated with said friction element for establishing a selected normal force between said friction surface and the member surface to increase a frictional engagement therebetween so that bending of the member surface due to transverse vibrations produces frictional sliding between said friction surface and the member surface, said retaining means comprises ridges formed on said friction element adjacent said friction surface and mating ridges formed on the elongated member adjacent the member surface.

17. A device according to claim 16, wherein said friction surface and member surface are inclined toward said friction element in a direction away from said ridges.

18. A device according to claim 17, wherein said retaining means include opposite facing walls between which said friction element and elongated member are disposed and a plurality of rollers disposed between said opposite walls and said friction element and elongated member for holding said friction surface and member surface together.

19. A method of reducing noise generated by transverse vibrations in an elongated member which are transverse to a major dimension of the elongated member, comprising:

providing a friction element having a friction slide surface and made of material which is sufficiently inextendible so that said friction slide surface when engaged on a surface of the elongated member under selected normal force frictionally slides with respect to the member surface;

disposing said element friction slide surface over an area of the member surface which undergoes maximum transverse displacement under transverse vibration thereof;

applying a selected normal force between said element and member to increase frictional engagement between said friction slide surface and the member surface so that localized lengthening or shortening of the member surface due to transverse vibration causes slippage between said friction slide surface and the member surface which generates heat and dissipates energy of the transverse vibrations; and providing ridges on the elongated member and ridges on said friction element and engaging said ridges together, and forming said slide surface and engaged member surface to be inclined with respect to the ridges.

20. A method according to claim 19, wherein said ridges comprise external threads on the elongated member and internal threads on said friction element, said friction element comprising a sleeve, said incline slide surface being inclined outwardly away from said threads and the member surface engaged by said slide surface being inclined outwardly away from said threads.

21. A device for reducing noise generated by transverse vibrations of an elongated rod-like member having an outer annular surface which undergoes bending due to such transverse vibrations, comprising:

external threads defined on the annular surface of said elongated member, a portion of said annular surface being inclined outwardly adjacent said threads;

a collar having an internal thread threadably engaged with said external thread of the elongated member and an inclined surface corresponding in shape and mating with said inclined surface of said elongated member; and said internal and external threads being shaped to form a self-locking engagement between said collar and the elongated member.

22. A device according to claim 21, wherein said collar includes an unthreaded space between said inclined surfaces and said internal and external threads.

23. A device according to claim 21, including a wear-resistant strip engaged between said inclined surfaces of said collar and elongated member.

24. A device according to claim 21, wherein said elongated member is a percussion tool.

* * * * *

UNITED STATES PATENT AND TRADEMARK OFFICE
CERTIFICATE OF CORRECTION

PATENT NO. : 4,516,658
DATED : May 14, 1985
INVENTOR(S) : Scarton et al

It is certified that error appears in the above-identified patent and that said Letters Patent is hereby corrected as shown below:

On the cover sheet, item [75] should read:
-- Anthony J. DiBianca --.

In title of invention the word "Coulome" is corrected to read as follows: Coulomb.

Signed and Sealed this

Sixteenth Day of July 1985

[SEAL]

Attest:

DONALD J. QUIGG

Attesting Officer

Acting Commissioner of Patents and Trademarks